United States Patent

[11] 3,587,328

| | | |
|---|---|---|
| [72] | Inventor | Wilfred C. Schuemann<br>Rawlings Heights, Rawlings, Md. |
| [21] | Appl. No. | 830,830 |
| [22] | Filed | June 5, 1969 |
| [45] | Patented | June 28, 1971 |
| [73] | Assignee | Hercules Incorporated, Wilmington, Del. |

[54] A FLUID-JET DEFLECTION TYPE INSTRUMENT HAVING A DIAPHRAGM TYPE PUMP WITH PIEZOELECTRIC ACTUATION
8 Claims, 6 Drawing Figs.

[52] U.S. Cl. ............................................. 73/516
[51] Int. Cl. ..................................... G01p 15/00
[50] Field of Search ................................. 73/514, 515, 516, 505; 137/87.5; 103/1; 310/8.1, 8.5, 8.6

[56] References Cited
UNITED STATES PATENTS
1,841,607   1/1932   Kollsman ..................... 73/180
3,361,067   1/1968   Webb ........................... 103/1

Primary Examiner—James J. Gill
Assistant Examiner—Herbert Goldstein
Attorney—William F. Smith ABSTRACT: A fluid jet deflection type instrument for sensing motion having a pump comprising a pair of laminated piezoelectric elements energized to expand and/or contract alternately so that the elements vibrate in the nature of a diaphragm pump, the elements having a pump orifice aligned across an intake chamber with an outlet orifice, whereby fluid is drawn through the pump orifice when the elements move to increase the volume of the pump chamber and a charge of fluid is expelled through the pump orifice and carries across the inlet chamber through the outlet orifice when the elements move to decrease the volume of the pump chamber.

PATENTED JUN 28 1971 3,587,328

WILFRED C. SCHUEMANN
*INVENTOR*

BY *William J. Smith*

AGENT

A FLUID-JET DEFLECTION TYPE INSTRUMENT HAVING A DIAPHRAGM TYPE PUMP WITH PIEZOELECTRIC ACTUATION

The present invention relates to a fluid pump and particularly to a fluid pump that is adapted for use in a fluid jet deflection type instrument.

Briefly, the pump in accordance with this invention comprises a pair of laminated disclike piezoelectric elements that define a diaphragm having a closed pump chamber at one face and an intake chamber at the other face. The diaphragm has a pump orifice that is aligned axially of the pump across the intake chamber with an outlet orifice. When voltage is applied across the surface of the laminated piezoelectric disc, the circumferential expansion of one of the elements and the contraction of the other element causes the diaphragm to buckle and thereby increases or decreases the volume of the pump chamber. When the voltage is applied with the opposite polarization, the diaphragm buckles in the opposite direction to decrease the volume of the pump chamber. When the volume of the pump chamber is increased, fluid is drawn into the pump chamber through the pump orifice from the intake chamber. When the volume of the pump chamber is decreased, a charge of fluid is expelled from the pump chamber through the pump orifice. This charge of fluid has sufficient energy to carry across the intake chamber and through the outlet orifice. The diaphragm is adapted to be vibrated at a relatively high frequency by periodically reversing the voltage on the piezoelectric elements.

The advantages of the present pump are that its physical size and weight are very small, which in turn reduces the size and weight of the instrument, thereby adapting the same for applications where these properties are critical. The pump also has very low power requirements, and, in view of the complete absence of any moving parts, is dependable and has a virtually unlimited useful life. At the same time, the pump does not involve a magnetic field, which adapts the same for use in an environment where such a field could disrupt other circuits or devices in the vicinity of the unit.

The present invention is hereinafter described with reference to the accompanying drawings, in which.

Figure 1:
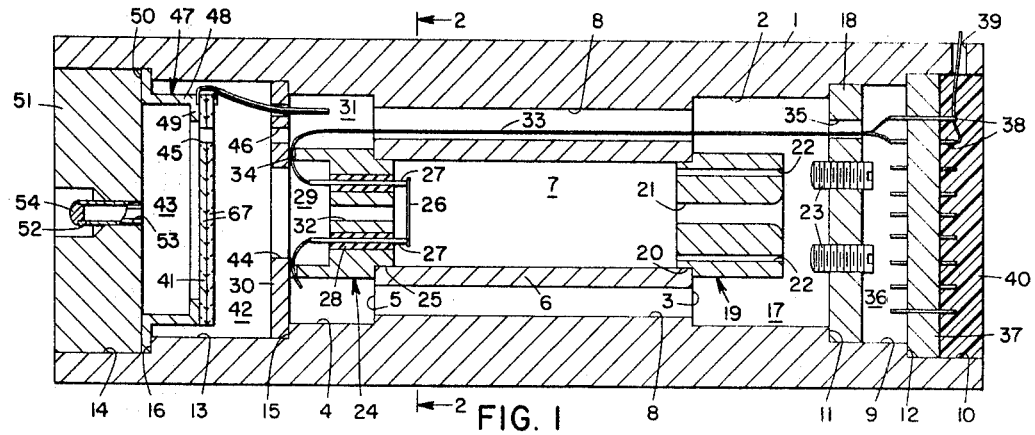
FIG. 1 is a schematic illustration in section of an instrument embodying the present invention.

With reference to the drawings, there is illustrated a fluid jet deflection type instrument embodying the present invention. The illustrated instrument comprises a cylindrical body 1 having bores extending axially inwardly from the opposite ends thereof including a first bore 2 at what is herein termed the nozzle end of the instrument and extending inwardly to a bottom wall 3, and a second bore 4 at the sensor end of the instrument and extending inwardly to a bottom wall 5. The bottom walls 3 and 5 are spaced to provide a central section 6 centrally of the body 1, which central section has an axial bore therethrough that defines a jet chamber 7. The central section 6 also has a plurality of smaller bores surrounding and disposed axially parallel to the jet chamber 7, which bores define fluid conduits or inlets 8 endwise of the unit from the sensor end to the nozzle end. There may for example be eight of the inlets 8 equally spaced angularly about the axis of the body 1.

The body 1 has a pair of counterbores 9 and 10 at the nozzle end of the unit, which counterbores terminate at shoulders 11 and 12 respectively. At the sensor end, there are a pair of counterbores 13 and 14 which terminate at shoulders 15 and 16 respectively.

The shoulder 11 at the base of the counterbore 9 is spaced from the bottom wall 3 of the bore 2 to provide a plenum chamber 17 between the bottom wall 3 and a plate 18 that is inserted into the counterbore 9 and seated on and permanently secured to the shoulder 11 as by an adhesive. A cylindrical nozzle member 19 is mounted in the plenum chamber 17 by means of a shoulder 20 inserted into the end of the jet chamber 7 and permanently secured therein as by an adhesive. The nozzle member 19 has a nozzle 21 directed endwise of the jet chamber 7 substantially along the axis thereof. A plurality of vents 22, such as bores formed in the nozzle member 19 about and axially parallel to the nozzle 21, may be provided in accordance with the invention forming the subject matter of U.S. Pat. application Ser. No. 632,238, now U.S. Pat. No. 3,500,690 dated Mar. 17, 1970. The nozzle member 19 is dimensioned relative to the plenum chamber 17 to provide for fluid flow from the inlets 8 into the plenum chamber 17 and between the ends of the nozzle member 19 and the plate 18 into the inlet ends of the nozzle 21 and vents 22. In accordance with the invention of U.S. Pat. application Ser. No. 830,828, filed June 5, 1969, a plurality of screws 23 may be threaded through the plate 18 to provide adjustable flow obstructions for adjusting the fluid flow to the nozzle and thereby adjusting the jet discharging from the nozzle relative to the axis of the jet chamber.

At the sensor end of the unit there is provided a sensor member 24 which, like the nozzle member 19, has a shoulder 25 that is received and permanently secured in the end of the jet chamber 7. The sensor member 24 provides means for supporting a pair of spaced sensor elements 26 in the jet chamber 7, which sensor elements may for example be platinum wires having a diameter of 0.0003 inch. The sensor elements 26 are mounted on and electrically connected to posts 27 which are made of an electrically conductive material and, in turn, extend through and are thus supported by the sensor member 24, the posts 27 being both secured to and electrically insulated from the sensor member 24 by ferrules 28.

The sensor member 24 has a bore extending inwardly from the end opposite from the jet chamber 7 to provide an exhaust chamber 29. The free edge of the sensor member 24 at the open end of the exhaust chamber 29 adjoins an orifice plate 30 that is inserted into the counterbore 13 and seated on and secured to the shoulder 15. The space between the orifice plate 30 and the bottom wall 5 of the bore 4 is thus divided into the exhaust chamber 29 within the sensor unit 24 and a pressure chamber 31 surrounding the sensor unit 24. The laterally chamber 29 is connected to the jet chamber 7 by a plurality of exhaust ports 32 extending through the sensor unit 24, which bores are as large as possible to provide for exhaust of the fluid from a jet directed endwise of the jet chamber 7 by the nozzle 21 with a minimum disruption of the jet about the sensing means. The inlets 8 are open into the pressure chamber 31 to provide fluid connections between the pressure chamber 31 and plenum chamber 17, and also serve as conduits for the wires 33 which are connected to the posts 27 in the exhaust chamber 29 and lead therefrom for example through notches 34 in the edge of the sensor element 24 into the pressure chamber 31 and then into the inlets 8. From the inlets 8, the wires 33 are directed through a hole 35 in the plate 18 into a wiring compartment 36 between the plate 18 and a connector plate 37 that is secured as by an adhesive on the shoulder 12 and which is provided with a plurality of terminals 38 extending therethrough. Outwardly of the plate 37, the terminal wiring is run laterally out a hole 39 while the balance of the space within the counterbore 10 is filled with a resin 40 to protect the connections at the terminals.

A pump diaphragm 41 is mounted transversely of the space enclosed by the counterbore 13, that is, the space between the shoulders 15 and 16, to provide an intake chamber 42 on one side of the diaphragm 41 and a pump chamber 43 at the other side of the pump diaphragm 41. The intake chamber 42 is connected to the exhaust chamber 29 in the sensor member 24 by an exhaust aperture 44 in the orifice plate 30. There is a pump orifice 45 in the pump diaphragm 41 adjacent to the periphery thereof and providing communication between the intake chamber 41 and the pump chamber 43. The orifice plate 30 is provided with an outlet orifice 46 that is aligned axially across the intake chamber 42 with the pump orifice 45.

The pump diaphragm 41 is supported by a flexible supporting element 47 including a cylindrical or sleevelike body portion 48 having an inwardly extending pump mounting flange 49 at the one end and an outwardly extending supporting flange 50 at the other end. The pump diaphragm 41 is rigidly secured at its periphery to the mounting flange 49 and the supporting element 47 is itself supported by the flange 50 which is seated against the shoulder 16 and clamped by a closure plate 51 adhesively secured in the space defined by the counterbore 14 and acting to close the sensor end of the body 1. The ring 48 of the supporting element 47 thus acts to enclose the periphery of the pump chamber 43 while providing for vibration of the pump diaphragm 41. For introducing fluid into the body 1, there is provided a tube 52 mounted in a bore 53 in the closure plate 51 which tube is sealed as by soldering 54 after the unit is filled.

The supporting element 47 is preferably formed of a material having a coefficient of expansion that substantially matches that of the crystals 67 so that there is minimum stress at the bond line. Such material may for example be "Invar" by the Latrobe Steel Co. of Latrobe, Pennsylvania, which is an iron-nickel alloy having a low coefficient of expansion.

The instrument described above, including its function and operation, is more fully disclosed in U.S. Pat. application Ser. No. 632,239, now U.S. Pat. No. 3,500,691 dated March 17, 1970, and in U.S. Pat. application Ser. No. 830,826, filed June 5, 1969, to which reference is made. The present invention is directed primarily to a pump means having specific utility in such an instrument and which comprises essentially the pump diaphragm 41. The function and operation of the instrument is hereinafter described only insofar as it is believed to be relevant to an understanding of this invention.

Briefly, in the operation of the illustrated instrument, the pump diaphragm 41 is actuated, that is, is caused to buckle alternately in opposite directions or to vibrate so that it alternately expands and reduces the volume of the pump chamber 43. When the volume of the pump chamber 43 is expanded as illustrated in the full lines in FIG. 4 wherein the buckling of the diaphragm 41 is exaggerated for purposes of illustration, fluid is drawn from the intake chamber 42 through the pump orifice 45 into the pump chamber 43. When the volume of the pump chamber 43 is reduced as illustrated in full lines in FIG. 5 which is also exaggerated, a charge of air is expelled from the chamber through the pump orifice 45. This charge of air has sufficient energy to carry across the intake chamber 42 and to pass through the outlet orifice 46 in the orifice plate 30 into the pressure chamber 31. From the pressure chamber 31, the fluid is directed by the inlets 8 to the plenum chamber 17 and to the nozzle 21 from which it issues as a laminar flow jet directed endwise of the jet chamber 7 toward the sensing elements 26. After passing over the sensing elements 26, the fluid jet is exhausted through the ports 32 into the exhaust chamber 29, and from there is drawn through the exhaust aperture 44 into the intake chamber 42 from which it is drawn and recirculated by the action of the pump diaphragm 41.

The instrument as illustrated is designed to respond to angular movement in a plane of sensitivity, that is, in a plane defined by the axis of the fluid jet, which is the axis of the nozzle 21, and the longitudinal midpoint of the sensing elements 26. This plane of sensitivity is indicated at S in FIG. 2. The instrument is initially adjusted so that the sensing elements 26 are uniformly immersed in the fluid jet issuing from the nozzle. Thereafter, a movement of the instrument in the plane of sensitivity during the time that an increment of the fluid jet is traveling from the nozzle to the sensing elements will displace the sensing elements laterally from a centered condition relative to that increment of fluid. That increment of fluid will therefore impinge nonuniformly upon the two sensing elements so that a greater cooling is imposed upon the one sensing element than upon the other.

Figures 2, 6:
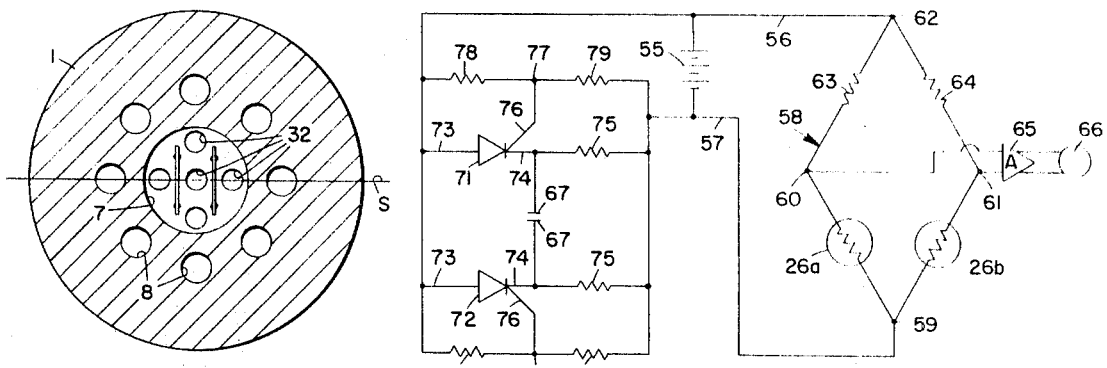
FIG. 2 is a section line taken substantially on the line 2-2 of FIG. 1.
FIG. 6 is a diagram of the electrical circuit for the instrument of FIG. 1.

The sensing elements are designed to respond to the nonuniform cooling thereof by the jets and to produce an output signal indicating the magnitude and the direction of the jet deflection and thus the rate and direction of the movement inducing the deflection. As mentioned above, the sensing elements 26 may be very fine platinum wires. With reference to FIG. 6, these wires are adapted to be heated in an electrical circuit comprising a source of power represented at battery 55 which is connected to a power lead 56 and a ground lead 57. The sensing elements 26 are represented individually at 26a and 26b which are connected in the opposite legs of a bridge 58 with one end of each of the sensing elements 26a and 26b being connected to the common output terminal 59 of the bridge. The sensing elements 26a and 26b are connected at their opposite ends to the bridge terminals 60 and 61 respectively which are in turn connected to the common input terminal 62 of the bridge through resistances 63 and 64 respectively. The sensing elements become heated by the power supplied thereto, and as the temperature thereof rises, the resistance also rises until an equilibrium is established between the heat developed and the heat dissipated. When the temperature of the sensing elements is then raised or lowered by variations in the amount of heat dissipated therefrom as the jet is moved laterally relatively to the sensing elements, or more accurately, as the sensing elements are moved relative to the location of the jet axis at the time an increment of fluid issues from the jet, the resistance of the sensing elements are moved relative to the location of the jet axis at the time an increment of fluid issues from the jet, the resistance of the sensing elements and thus the voltage at the bridge terminals 60 and 61 varies. The bridge terminals 60 and 61 are connected through an amplifier 65 to an output indicated generally at 66.

Figure 3:
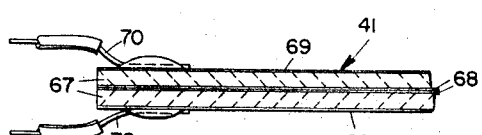
FIG. 3 is a fragmentary detail sectional view of the pump diaphragm of the instrument of FIG. 1.

The pump diaphragm 41 comprises a pair of laminated discs each comprising a disclike piezoelectric crystal 67 having electrically conducting plate 68, FIG. 3, which may for example be brass bonded to the one face thereof and a conductive coating 69 such as silver on the other face. The two discs are positioned with the plates 68 in contact and are bonded together as by an epoxy interposed between the opposed surfaces of the plates 68. Electrical connections are made to the outer faces of the pump diaphragm 41 by leads 70 which are for example soldered to the coating 69 thereon.

Figure 4:
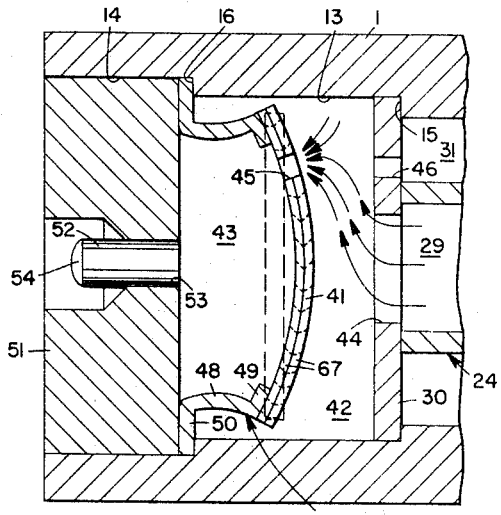
FIGS. 4 and 5 are fragmentary sectional views similar to FIG. 1 illustrating the operation of the pump.
Figure 5:
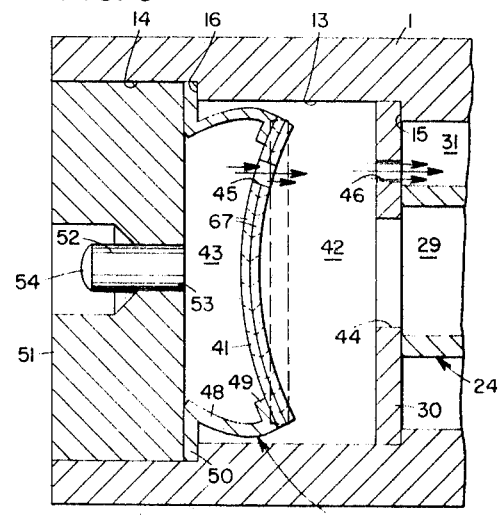

In the operation of the pump, when a positive voltage is applied to one of the crystals 67, that crystal expands circumferentially, that is, with the planar or disclike crystals herein illustrated, it expands in the plane thereof. When a negative voltage is applied, the crystal contracts circumferentially. In both instances, when the voltage is removed, the crystal relaxes. With the two crystals 67 bonded together or laminated, when one of the crystals is expanded or contracted relative to the other, the pump diaphragm 41 buckles as shown in FIGS. 4 and 5. An expanded crystal is at the convex face of the diaphragm 41 and a contracted crystal is at the concave face of the diaphragm. By way of example, when a positive voltage is applied to the crystal 67 adjacent to the pump chamber 43 and/or a negative voltage is applied to the other crystal, the pump diaphragm 41 buckles in the direction to decrease the volume of the pump chamber as shown in FIG. 5, whereas, when the voltages are reversed, the pump diaphragm buckles in the direction to increase the volume of the pump chamber 43.

In FIG. 6, there is illustrated a circuit for alternately applying a positive voltage to the crystals 67, which circuit comprises a pair of silicon controlled rectifiers 71 and 72, hereinafter called SCR's, each of which is connected by an anode lead 73 to a source of electrical power, such as the power lead 56. The cathode of each of the SCR's 71 and 72 is connected by a cathode lead 74 to a resistance 75 which is in turn connected to the ground lead 57. Each of the cathode leads 74 is also connected to one of the crystals 67. The gate leads 76 of the SCR's 71 and 72 are connected to the junction point 77 between a pair of resistances 78 and 79 which are connected at their opposite ends to the power lead 56 and to the ground lead 57 respectively.

When one of the SCR's is conducting, it will continue to conduct until the voltage at its cathode becomes more positive than the voltage at its anode. When the SCR is open or nonconducting, it will remain open until the voltage at its gate becomes positive relative to the voltage at its cathode. Assuming SCR 71 is conducting, SCR 72 is then open. The voltage at the gate lead 76 of SCR 72 is then the line voltage at the power lead 56 reduced by the voltage drop across the resistance 78 and the voltage at the cathode lead 74 of the SCR 72 is a function of the charge stored in the crystal and the voltage of the cathode of SCR 71 because of the capacitance effect of the crystals 67, which charge is being drained off to the ground lead 57 through the resistance 75 so that the voltage at the cathode lead 74 of the SCR 72 is decaying. As soon as the decay of the voltage at the cathode lead 74 drops that voltage below the voltage at the gate lead 76, SCR 72 becomes conductive. The immediate effect is to raise the voltage at the cathode lead 74 of the SCR 72 substantially to the line voltage of the power lead 56, which in turn, because the charge stored by the capacitance effect of the crystals 67 cannot be drained instantaneously through the resistance 75 connected to the SCR 71, raises the voltages on the cathode lead 74 of the SCR 71 above the line voltage. The cathode of the SCR 71 thus becomes more positive than the anode and SCR 71 is open, SCR 71 remains open and nonconducting as the charge on the crystals 67 is drained off through the resistance 75 and until the voltage thus drops to below the voltage at the gate lead 76 of the SCR 71, that is, the line voltage at the power lead 56 less the voltage drop across the resistance 78. As soon as the gate voltage is more positive than the cathode voltage, SCR 71 becomes conductive, which, in the same manner as described above, opens the SCR 72. The cycle is continuously repeated with the timing of the alternate opening and closing of the SCR's 71 and 72 determined by the size of the resistance 75 which limits the rate at which the charge is drained from the crystals 67.

By virtue of the above circuit, the voltage applied to the crystals 67 is alternated whereby the crystals are alternately expanded and relaxed. As discussed above, the alternate expansion of the crystals 67 causes the pump diaphragm 41 to vibrate in the nature of the diaphragm of a diaphragm pump to force charges of the fluid through the outlet orifice 46 into the pressure chamber 31. In a typical installation wherein the pump diaphragm has a diameter of about three-fourths of an inch and is vibrated at about 5,000 cycles per second, the pump will deliver about 2 cubic feet of fluid per hour at a pressure of 0.0005 pound per square inch.

In order to minimize power requirements, the pump is preferably operated at the natural frequencies of the pump diaphragm 41 and of the fluid in the pump chamber 43. The natural frequency of the pump diaphragm 41 can be determined experimentally for example by mechanically imparting a vibration to the diaphragm and observing the frequency at which it operates. The natural frequency of the fluid column is a function of the dimensions of the pump chamber 43 and the pump orifice 45 and of the viscosity and other physical properties of the fluid. This latter frequency can be determined experimentally by observing the output of the pump and the power input, with the natural frequency being evidenced by a dramatic increase in pump efficiency at the resonant frequency. Matching the natural frequencies of the pump diaphragm and the fluid column can be effected for example by varying the diameter of the pump orifice 45.

The circuit described above for actuating the pump diaphragm 41 tends to drive the unit automatically at the natural frequency of the pump diaphragm. This is because of the relationship between the physical displacement of the crystal 67 and the voltage that is maintained thereby, which supplements the voltage maintained by the capacitance effect of the crystals 67. Assuming that the resistances 75 are not so large that they would impede dissipation of the voltage on the cathode lead 74 to a rate that is slower than that determined by the natural frequency of the crystals 67, the crystals will tend to relax at their natural frequency and will thus exert a control on the voltages at the cathode leads 74.

The use of a pair of laminated piezoelectric crystals in a pump is disclosed broadly for example in the prior art, for example, the U.S. Pat. of Johnson et al., Nos. 2,928,409 and 3,107,630. An impulse type fluid pump is also know in the prior art, for example, in the U.S. Pat. of Hartline, No. 2,312,712. The novelty in accordance with this invention is in the combination of the piezoelectric crystals 67 in the pump diaphragm 41 of an impulse type pump, in the physical arrangement of the elements in which the pump diaphragm 41 is disposed between the pump chamber 43 and the intake chamber 42 and the pump orifice 45 in the pump diaphragm 41, which provides a compact and efficient design, and in the combination of the pump and the fluid jet deflection type instrument wherein the efficiency, reliability, low power requirements, compactness and absence of an external electrical or magnetic field are significant.

I claim:

1. A fluid-jet deflection type instrument for sensing motion, said instrument comprising in combination:
   a. a pump chamber having a pump orifice at one side thereof and pump means for expanding and reducing the volume of said pump chamber upon actuation thereof,
   b. an orifice plate disposed in spaced relation to said one side of said pump chamber to define an intake chamber into which said pump orifice opens and having an outlet orifice aligned axially with said pump orifice,
   c. means for actuating said pump means for periodically expanding and reducing the volume of said pump chamber whereby fluid is drawn from said intake chamber through said pump orifice into said pump chamber when the volume of said pump chamber is expanded and charge of fluid is expelled from said pump chamber through said pump orifice and across said intake chamber and through said outlet orifice when the volume of said pump chamber is reduced,
   d. said pump means comprising a pump diaphragm, and means for mounting said pump diagram at said one side of said pump chamber, and said pump orifice being formed in said pump diaphragm,
   e. sensing means for responding to the position of a fluid jet relative thereto,
   f. a nozzle for directing a fluid jet onto said sensing means,
   g. conduit means for directing fluid from said outlet orifice to said nozzle, and
   h. exhaust means for directing the fluid into said intake chamber after passing the sensing means.

2. A fluid-jet deflection type instrument for sensing motion, said instrument comprising in combination:
   a. a pump chamber having a pump orifice at one side thereof and pump means for expanding and reducing the volume of said pump chamber upon actuation thereof,
   b. an orifice plate disposed in spaced relation to said one side of said pump chamber to define an intake chamber into which said pump orifice opens and having an outlet orifice aligned axially with said pump orifice,
   c. means for actuating said pump means for periodically expanding and reducing the volume of said pump chamber whereby fluid is drawn from said intake chamber through said pump orifice into said pump chamber when the volume of said pump chamber is expanded and a charge of fluid is expelled from said pump chamber through said pump orifice and across said intake chamber and through said outlet orifice when the volume of said pump chamber is reduced,
   d. said pump means comprising a pump diaphragm having a pair of laminated disclike piezoelectric elements, and said means for actuating said pump means comprising means for applying voltage alternately to said piezoelectric elements,
e. means for mounting said pump diaphragm at said one side of said pump chamber, and said pump orifice being formed in said pump diaphragm,
f. sensing means for responding to the position of a fluid-jet relative thereto,
g. a nozzle for directing a fluid-jet onto said sensing means,
h. conduit means for directing fluid from said outlet orifice to said nozzle, and
i. exhaust means for directing the fluid into said intake chamber after passing the sensing means.

3. An instrument in accordance with claim 2 wherein the means for mounting said pump diaphragm comprises a supporting element having a sleeve-like body portion and mounting means at one end thereof, said pump diaphragm being secured at its periphery to said mounting means whereby said pump chamber is enclosed by said body portion and said pump diaphragm, said body portion being flexible to accommodate actuation of said pump diaphragm.

4. An instrument in accordance with claim 3 wherein said supporting element has a coefficient of expansion substantially matching that of said pump diaphragm.

5. An instrument in accordance with claim 4 wherein said supporting element is formed of an iron-nickel alloy.

6. An instrument in accordance with claim 2 wherein said means for actuating said pump means comprises an electrical switching circuit whereby the voltage applied to said piezoelectric elements is alternated automatically.

7. An instrument in accordance with claim 6 wherein the voltage on said piezoelectric elements is alternated at the resonant frequency of said elements.

8. An instrument in accordance with claim 7 wherein the pressure chamber and pump orifice are dimensioned to operate at the fluid resonant frequency.

PO-1050
(5/69)

UNITED STATES PATENT OFFICE
CERTIFICATE OF CORRECTION

Patent No. U.S.P. 3,587,328      Dated June 28, 1971

Inventor(s) Schuemann, Wilfred C.

It is certified that error appears in the above-identified patent and that said Letters Patent are hereby corrected as shown below:

Col. 2, Line 48 of printed patent; pg. 5, line 13 of spec. - "laterally" should read --exhaust--

Col. 3, Line 3 of printed patent; pg. 6, line 9 of spec. - "41" should read --42--

Col. 3, Line 26 of printed patent; pg. 6, line 31 of spec. - there is an "a" omitted after word "Such"

Col. 4, Line 31,32,33,34 of printed patent; pg. 9, line 8 of spec. - the following has been repeated --are moved relative to the location of the jet axis at the time an increment of fluid issues from the jet, the resistance of the sensing elements--

Signed and sealed this 21st day of December 1971.

(SEAL)
Attest:

EDWARD M. FLETCHER, JR.
Attesting Officer

ROBERT GOTTSCHALK
Acting Commissioner of Patents